United States Patent [19]

Rochester

[11] Patent Number: 4,852,246
[45] Date of Patent: Aug. 1, 1989

[54] METHOD OF INSULATING A FIELD WINDING COIL

[76] Inventor: D. Eugene Rochester, Rte. 1, Box 447, Walhalla, S.C. 29691

[21] Appl. No.: 267,560

[22] Filed: Nov. 7, 1988

[51] Int. Cl.$^4$ .............................................. H02K 15/10
[52] U.S. Cl. ....................................... 29/596; 29/606; 310/215; 310/218
[58] Field of Search .......................... 29/596, 598, 606; 310/42, 218, 194, 215

[56] References Cited

U.S. PATENT DOCUMENTS 3,612,930 10/1971 Raby ..................................... 310/218
4,514,655 4/1985 Hosoya ............................... 310/218

Primary Examiner—Carl E. Hall
Attorney, Agent, or Firm—Rodgers & Rodgers

[57] ABSTRACT

An insert sheet formed of insulating material includes an outer border portion and a pair of door-like panels foldably mounted on the border portion, the insert sheet being disposed with its border portion interposed between the inner surface of the motor housing and a field coil and the door-like panels being interposed between the winding coil and oppositely disposed surfaces of the associated field pole.

4 Claims, 2 Drawing Sheets

METHOD OF INSULATING A FIELD WINDING COIL

TECHNICAL FIELD

This invention relates to electric motors of the direct current type which are primarily used as automobile starters, the invention being specially applicable to rebuilding such starters.

BACKGROUND ART

Used direct current electric motor automobile starters commonly fail due to break down of insulation between field winding conductors and the motor housing or the associated field pole. It is the practice to rebuild such generators by removing the original field coils and by substituting new field coils or by reinsulating the original winding conductors either by winding insulating tape thereabout or by other known means. These known procedures are time consuming and expensive and in some cases may impede or prevent rotation of the associated rotor.

SUMMARY OF THE INVENTION

According to this invention in one form, a field winding coil of a direct current starter motor is insulated from its associated housing and from the pole piece about which such winding is disposed by means of an insert sheet having an outer border portion and a pair of door-like panels foldably mounted on the border portion, the insert sheet being inserted into position after removal of the associated pole piece by simply moving the field winding coil to a position of spaced relation to the inner surface of the motor housing and thereafter placing the insert into a position such that its border portion is interposed between the field winding coil and the motor housing and with its door-like panels disposed immediately adjacent the inner portions of the field winding coil which are normally disposed adjacent opposite surfaces of the associated pole piece and thereafter reassembling the pole piece into its normal operating position.

BEST MODE OF CARRYING OUT THE INVENTION

Figure 1:
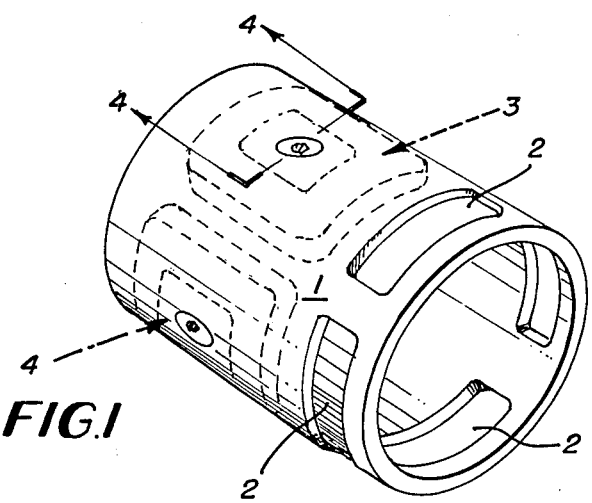
FIG. 1 is a perspective view of the housing of a direct current electric motor with all parts removed from the housing except two pole pieces and their associated field winding coils which are shown in dotted lines.

With reference to FIG. 1, the numeral 1 designates the housing of a conventional electric motor starter having four arcuate apertures 2 formed therein which are conventional. Conventional field poles and their associated field winding coils are shown in phantom lines and are designated by the numerals 3 and 4. Two additional field poles and field winding coils are not shown in FIG. 1.

Figure 2:
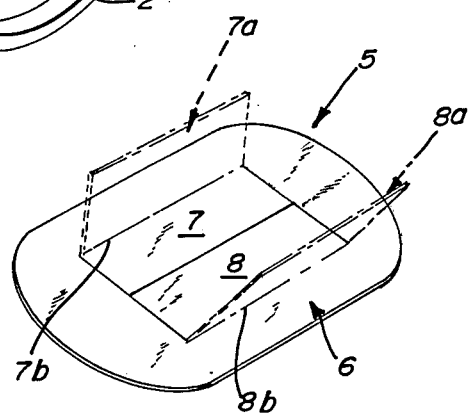
FIG. 2 is a view of the insulating insert sheet formed according to this invention and which shows its border portion and its door-like panels shown in the plane of the border portion in solid lines and with the door-like panels folded out of the plane of the border portion of the insert and which are shown in phantom lines.

With reference to FIG. 2, an insulating insert sheet formed according to this invention is generally designated by the numeral 5 and includes a border portion 6 and a pair of door-like panels 7 and 8. Panels 7 and 8 are shown in solid lines in the plane of the border portion 6 and these door-like panels are shown in phantom lines at 7a and 8a when swung out of the plane of border portion 6.

Figure 3:
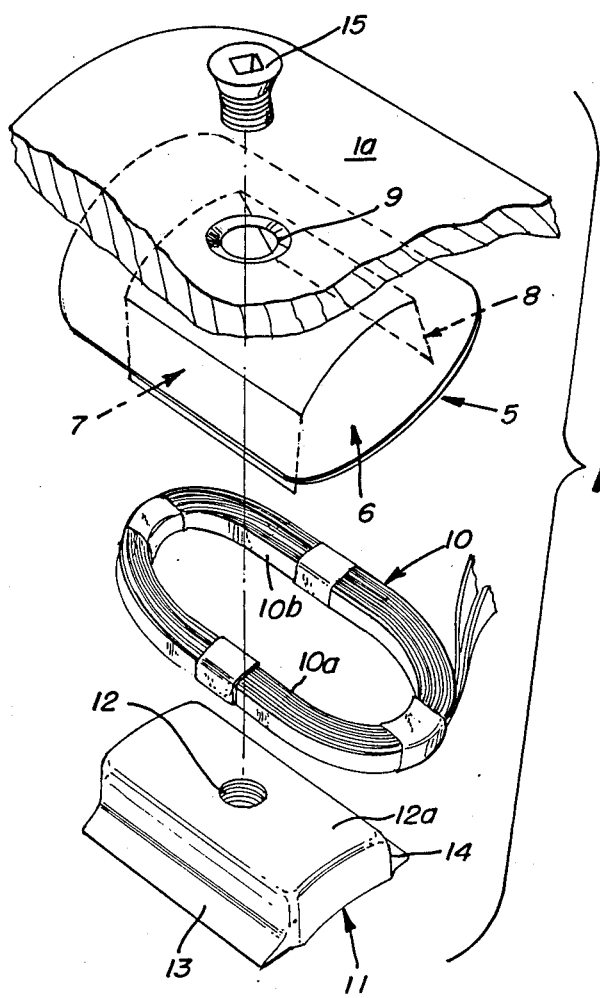
FIG. 3 is an exploded view of a fragmentary portion of a motor housing together with the associated insert sheet, field winding coil and pole piece.

With reference to FIG. 3, the numeral 1a designates a fragmentary portion of a motor housing in which an aperture 9 is formed. Disposed underneath and inside fragment 1a of housing 1 is the insert sheet 5 formed according to this invention. As is apparent in FIG. 3, the door-like panels 7 and 8 are shown in the position depicted at 7a and 8a in FIG. 2 except the insulating insert 5 is shown upside down in FIG. 3 from the position shown in FIG. 2, i.e., with the door-like panels 7 and 8 projected downwardly and with the border portion 6 of the insert sheet 5 disposed in an arcuate configuration generally similar to the arcuate configuration of the housing fragment 1a.

Field winding 10 is shown in FIG. 3 between the pole piece 11 and the insulating insert sheet 5 together with the associated housing fragment 1a. The field winding coil 10 is conventional as is the pole piece 11. The pole piece 11 includes a threaded aperture 12 together with laterally extending flange elements 13 and 14.

Figure 4:
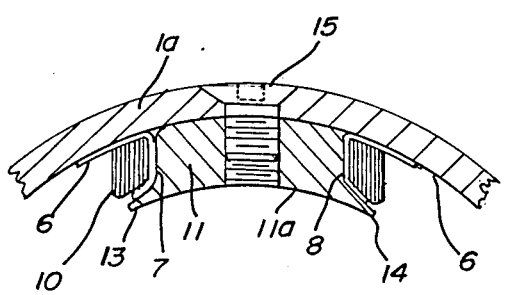
FIG. 4 is a fragmentary cross sectional view taken along the line designated 4—4 in FIG. 1 and which shows the elements of FIG. 3 in assembled condition.

As shown in FIG. 4 and with the parts insulated according to this invention by means of the insulating insert sheet 6, the border portion 6 of insulating sheet 5 is interposed between the field winding coil 10 on opposite sides thereof and the door-like panels 7 and 8 are interposed between opposite inner surfaces of the field winding coil 10 and the opposite sides of the pole piece 11 and the transverse side flanges 13 and 14 thereof, the parts being securely held in the position shown in FIG. 4 due to the screw 15 and its threaded relationship with the aperture 12 formed in pole piece 11.

Figure 5:
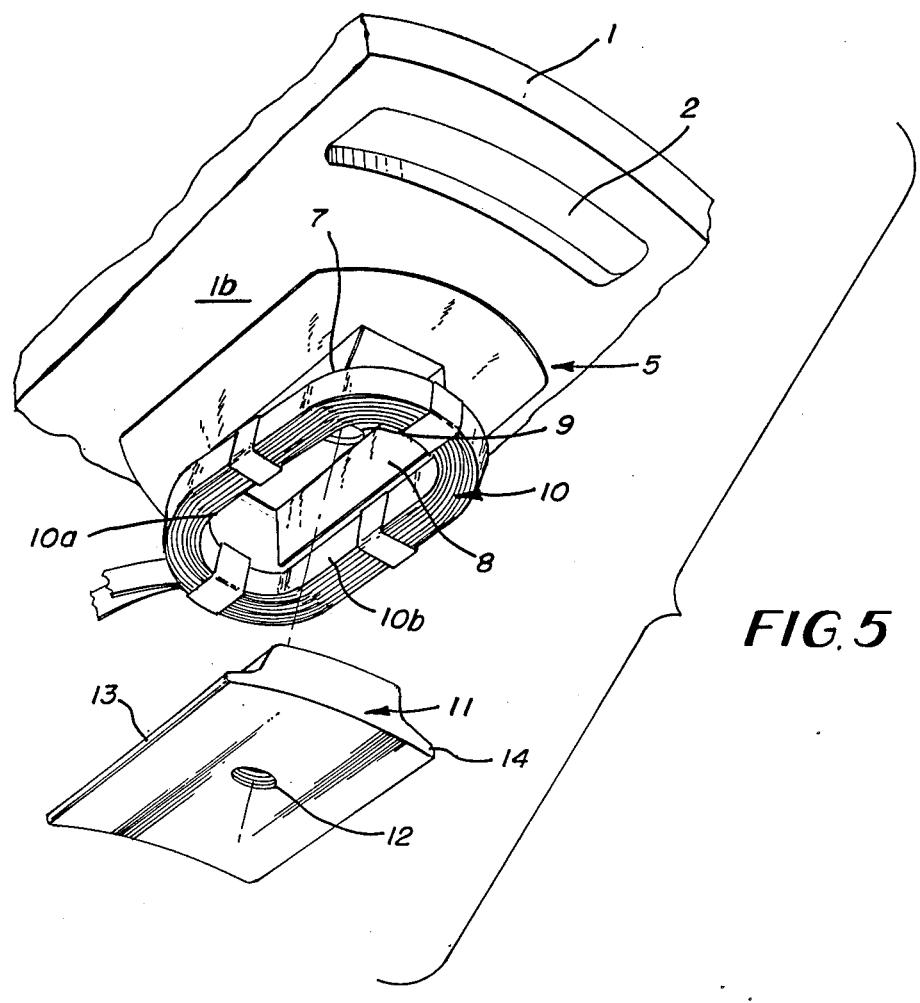
FIG. 5 is an exploded perspective view which demonstrates a step in the method by which the insert sheet of insulating material is placed in position to insulate one field coil winding from the motor housing and its associated field pole.

In order to place the insulating insert sheet 5 into position, the pole piece 11 is removed by removing the set screw 15. Thereafter the field winding coil 10 is moved in a direction away from the inner surface 1b of housing fragment 1 to occupy a position of spaced relation relative to the housing as shown in FIG. 5. Insert 5 is then inverted from the position shown in FIG. 2 and is simply moved into the space between the inner surface 1b of housing 1 and the adjacent surfaces of field winding coil 10. The door-like panel 7 is then disposed adjacent the inner surface 10a of field winding coil 10 and the door-like panel 8 is disposed adjacent the inner surface 10b of field winding coil 10. Thereafter the pole piece 11 is moved into the position shown in FIG. 4 and the screw 15 is threaded into the internally threaded aperture 12 so as to hold the border portion 6 of insert sheet 5 in a snug position between the inner surface of housing 1 and the field winding coil 10 and the door-like panels 7 and 8 are disposed in the positions shown in FIG. 4 so that the field winding coil 10 is completely insulated from the housing 1 and the associated pole piece 11.

According to a feature of this invention, the insulating insert sheet 5 is specially configured and is formed of a Mylar layer sandwiched between and secured to a pair of outer Dacron layers. This structure is approximately 6 mils thick no part of the insert sheet is disposed between the housing and the pole piece. Thus surface 12a of pole piece 12 contacts the inner surface 1b of housing 1 so as to allow free and unencumbered clearance between the rotor (not shown in the drawings) and the inner surface 11a of the pole piece 11.

In order to facilitate manipulation of the door-like panels 7 and 8 to the positions represented in FIG. 2, it is desirable to form a score line along the fold lines 7b and 8b by which the door-like panels 7 and 8 are foldably joined to the border portion 6 of insert sheet 5. This score line may be formed on one or both surfaces of the sheet 5 as may be desirable or necessary.

The so-called "spike" voltage such as may be generated due to a sudden change of current magnitude may amount to approximately 600 volts. The insulating material of the insulating insert sheet 5 is capable of withstanding such voltage and is capable of withstanding the ambient temperature within the housing and any temperature to which it is subjected by conduction.

From the above description, it is clear that this invention is applicable to various sizes and designs of starters and that by the invention replacing or rewinding the original field coils with insulation is eliminated. Furthermore, the installation of the insulating insert sheet is effected without completely disassembling the motor. Thus substantial economies are effected according to this invention both in the use of material and in the time required to rebuild used starter motors.

Experience in the actual practice of this invention indicates that an average of $7.00 to $8.00 in U.S. currency is saved per starter.

I claim:
1. A method of insulating a field winding coil of a direct current starter motor, said motor having a motor shaft, an armature, an armature winding, a motor housing, field poles, and a commutator, from the motor housing an d from an associated field pole about which said winding coil is disposed, the method comprising the steps of; removing the rotor shaft and its associated armature winding and commutator, removing the field pole associated with said field coil, moving the winding inwardly relative to said housing and to a position of spaced relation to an inner surface of the housing, placing an insert sheet having a border portion and a pair of door-like panels into a position such that said border portion is interposed between said housing and said winding coil and said door-like panels are moved into said coil winding and to positions immediately adjacent the portions of said coil winding which are normally in contact with said field pole, and reassembling said field pole into a position of snug engagement with said door-like panels and with said border portion securely gripped between said winding and the inner surface of said housing.

2. A method of insulating a field winding coil according to claim 1 wherein said door-like panels are disposed in angular relation to said border portion and wherein said door-like panels project inwardly to facilitate their entry into said field winding coil to positions adjacent the portions of said field winding coil which are normally adjacent to said field pole.

3. A method of insulating a field winding coil according to claim 2 wherein adequate clearance is afforded between the armature and the adjacent surface of said field pole to accommodate free and unencumbered rotation of said armature.

4. A method of insulating a field winding coil according to claim 2 wherein said field pole is in direct contact with the inner surface of the housing after reassembly of said field pole.

* * * * *